United States Patent [19]

Okajima

[11] 4,313,352
[45] Feb. 2, 1982

[54] PEDAL FOR A BICYCLE

[75] Inventor: Shinpei Okajima, Sakai, Japan

[73] Assignee: Shimano Industrial Company Limited, Osaka, Japan

[21] Appl. No.: 90,856

[22] Filed: Nov. 2, 1979

[30] Foreign Application Priority Data

Nov. 11, 1978 [JP] Japan .......................... 53-155527[U]

[51] Int. Cl.³ .............................................. G05G 1/14
[52] U.S. Cl. .................................................. 74/594.4
[58] Field of Search ................... 74/594.1, 594.4, 560; 116/62, 28 R; 192/5; 350/97, 103

[56] References Cited

FOREIGN PATENT DOCUMENTS

| 713326 | 11/1941 | Fed. Rep. of Germany | 116/28 |
| 731383 | 2/1943 | Fed. Rep. of Germany | 116/62 |
| 923348 | 2/1955 | Fed. Rep. of Germany | 116/62 |
| 898926 | 7/1944 | France | 74/594.4 |
| 441436 | 11/1948 | Italy | 74/594.1 |

Primary Examiner—Kenneth Dorner
Attorney, Agent, or Firm—Stevens, Davis, Miller & Mosher

[57] ABSTRACT

A pedal for a bicycle, which has a support having reflectors and being separate from a pedal body, the support being mounted thereto in relation of being swingable between a vertical position where the support projects downwardly from the lower surface of the pedal body and a horizontal position, so that when the bicycle is driven in the night, the support may project downwardly from the lower surface of pedal body to expose the reflectors, and when the reflectors are not necessary for use, the support may swing to reach the horizontal position and be held thereat.

1 Claim, 6 Drawing Figures

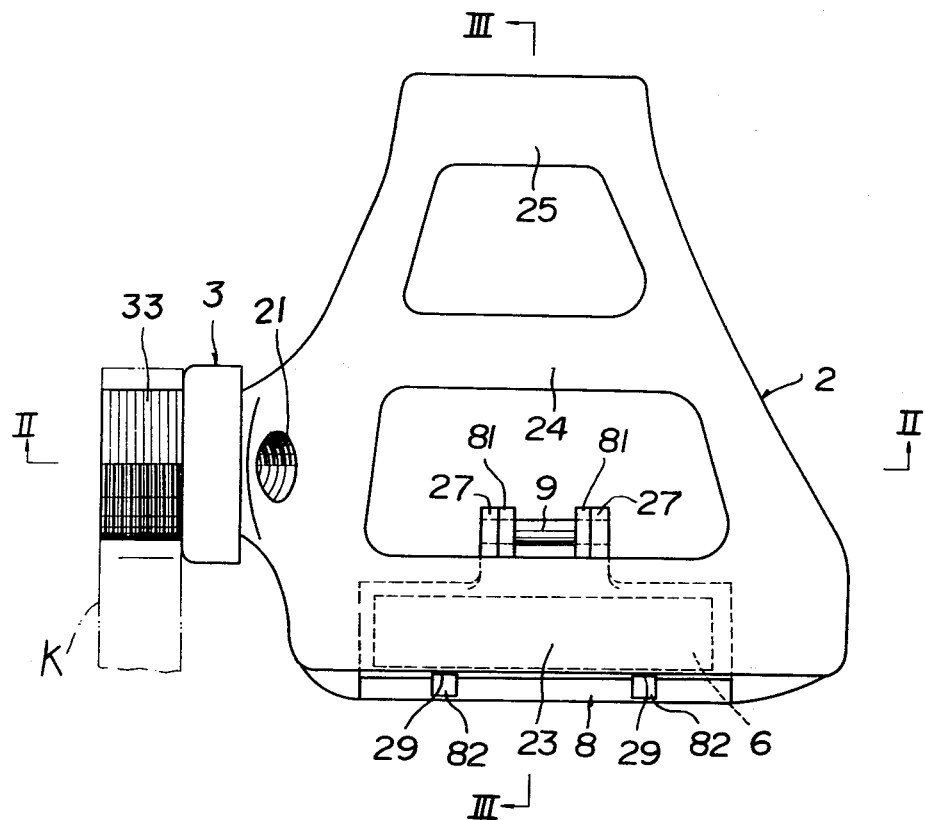
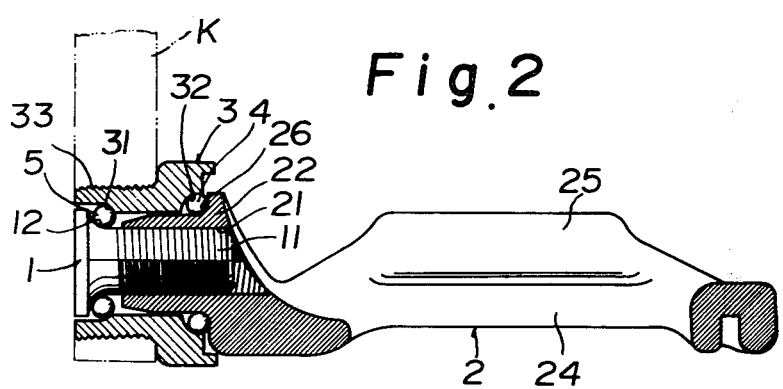

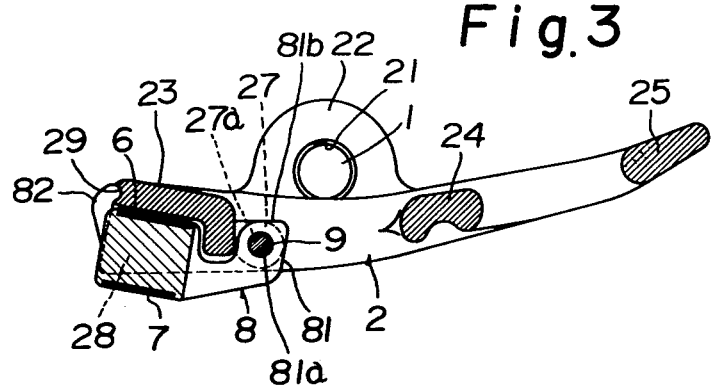
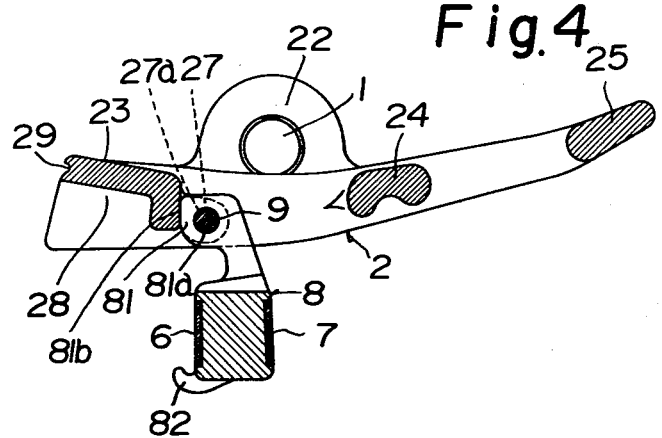
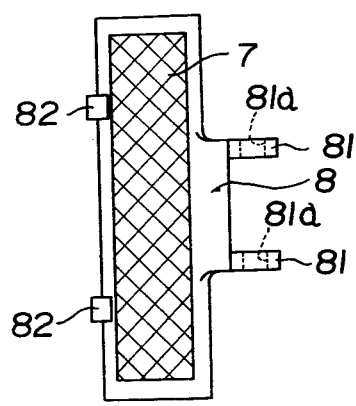
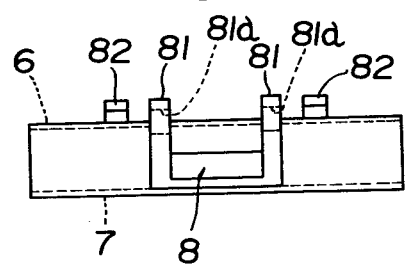

PEDAL FOR A BICYCLE

BACKGROUND AND SUMMARY OF THE INVENTION

This invention relates to a pedal for a bicycle, and more particularly to a pedal having reflectors provided at a pedal body.

Conventionally, the pedal for the bicycle is provided at the pedal body with reflectors fixed to the front and rear surfaces of the pedal body longitudinally of the bicycle by means of fixing means, such as adhesives, the reflectors serving to reflect the light illuminated from the headlight of an automobile.

The front and rear surfaces of the pedal body are not always vertically as wide as required, but narrow, curved or slanted due to the pedal body shape. Hence, the front and rear surfaces, when formed flat and wide, facilitate fixing of the reflectors, but, when formed too narrow to attach the reflectors, curved or slanted, are difficult to carry the reflectors. The reflectors, even if mounted to the support, are not sufficient for ensuring the full reflective effect.

Accordingly, the conventional pedal body has the front and rear surfaces designed to be larger in vertical width than the prescribed dimension, or slanted at a certain angle with respect to the pedal body, thereby mounting the reflectors to both the surfaces. Therefore, the pedal body is restricted in design of its shape, thereby making it impossible to form it in a flat shape for less air-resistance when in use.

In order to overcome the aforesaid problems, this invention has been designed. A main object of the invention is to provide a pedal having reflectors mountable to the pedal body regardless of a shape thereof, that is, even when the front and rear surfaces of the pedal body are so shaped that the reflectors are not mountable thereto or the reflective effect is not fully expectable from the reflectors even if mounted to the pedal body, the reflectors are mountable to the pedal body, so that the reflectors can reliably reflect the light illuminated from the headlights of an automobile coming from before or after the bicycle, thereby allowing a driver of the automobile to be careful of the running bicycle. Another object is to provide a pedal capable of retracting the reflectors to the pedal body underside side when they are not necessary for use in the daytime or the like.

The pedal of this invention is provided with a support having reflectors and separate from a pedal body, the support being mounted thereto swingably between a position where the support is substantially vertical with respect to the pedal body and projects downwardly from the lower surface thereof and a position where the support is substantially horizontal to the pedal body, so that when the bicycle is driven in the night, the support allows the reflectors to appear downwardly from the lower surface of the pedal body, and when the reflectors are unnecessary for use in the daytime or the like, the support swings and is held at the substantially horizontal position.

The invention is able to desirably design the pedal body because the reflectors are attached to the support separate from the pedal body, whereas, the reflectors ensure reflection of the light from the headlight of an automobile coming from before or after the bicycle to thereby allow a driver for the automobile to be careful of the bicycle.

Furthermore, when the reflectors are not necessary for use in the daytime or the like, the support swings to be held along the pedal body so as not to hinder pedalling.

These and other objects and novel features of the invention will be apparent from the description of an embodiment of the invention in accordance with the accompanying drawings.

BRIEF DESCRIPTION OF THE DRAWINGS

FIG. 1 is a plan view of an embodiment of the invention,

FIG. 2 is a sectional view taken on the line II—II in FIG. 1,

FIG. 3 is a sectional view taken on the line III—III in FIG. 1,

FIG. 4 is a sectional view of a reflector when in use,

FIG. 5 is a plan view of the reflector only, and

FIG. 6 is a side view thereof.

DETAILED DESCRIPTION OF THE INVENTION

Referring to the drawings, reference numeral 1 designates a pedal shaft. The pedal shaft 1 is provided at the outer periphery of one axial end with a screw thread 11 and at the outer periphery of the other axial end with a ball race 12.

Reference numeral 2 designates a pedal body screwable with the screw thread 11 at the pedal shaft 1. The pedal body 2 is made of light alloy, such as aluminum, and formed in a thin shape. At the left side (in FIG. 2) of the pedal body 2 is provided a mounting portion 22 having a threaded bore 21, so that the screw thread 11 at the pedal shaft 1 is screwed with the threaded bore 21 to thereby mount the mounting portion 22 to the pedal shaft 1. The pedal body 2, when the pedal is attached to the bicycle, is provided at the upper surface and at both sides longitudinally of the bicycle with first and second foot bearing surfaces 23 and 24. The second foot bearing surface 24 in the front of the pedal body 2 is extended forward to form a third foot bearing surface 25 to contact with toes of a cyclist's foot placed onto the first and second foot bearing surfaces 23 and 24. The third foot bearing surface 25 elongates the foot bearing surface at the pedal body 2 forward with respect to the pedal shaft 1, whereby length ahead of the pedal shaft 1 and length rearward therefrom are in the ratio of 1 and 1.3 through 2.

The pedal body 2 is displaced at the center of its vertical length downwardly with respect to the axis of the pedal shaft 1, so that when the pedal body 2 is supported rotatably with respect to a crank arm K as described hereinafter, the respective foot bearing surfaces 23 to 25 are facing always upward.

The pedal body 2 is supported to the crank arm K in such a manner that; a ball race 26 is formed at the outer periphery of the mounting portion 22; onto the outer peripheries of the mounting portion 22 and pedal shaft 1, is sleeved a bearing cylinder 3 having ball races 31 and 32 opposite to the ball races 12 and 26 respectively; balls 4 and 5 are inserted between the ball race 32 at the bearing cylinder 3 and ball race 26 at the mounting portion 22 and between the ball race 31 at the bearing cylinder 3 and ball race 12 at the pedal shaft 1 respectively, so that the pedal shaft 1 and pedal body 2 are supported rotatably to the bearing cylinder 3; and at the outer periphery of the bearing cylinder 3 is provided a screw thread 33 through which the bearing cylinder 3 is screwably fixed to the crank arm K.

The pedal of the invention has a support 8 which is supported swingably to the pedal body 2 and has a pair of reflectors 6 and 7 separate therefrom.

Referring to FIGS. 3 and 4, a pair of bearings 27 having shaft holes 27a are provided ahead of the first foot bearing surface 23 positioned at the rear side of the pedal body 2, under the first foot bearing surface 23 is provided a receiving chamber 28 opening downward, and at the support 8 are provided a pair of bearings 81 having shaft holes 81a. The shaft holes 81a at the support 8 and those 27a at the pedal body 2 are inserted with a shaft 9 to thereby rotatably support the support 8 to the pedal body 2 through the shaft 9.

The support 8 is made from plastic material and formed in a laterally elongated rectangular shape as shown in FIG. 5 and 6. At an intermediate portion lengthwise of the support 8 are provided the bearings 81 projecting therefrom. A vertical width of the support 8 including each bearing 81 is larger than length from the axis of each bearing 27 to the bottom of pedal body 2. The support 8 swings around the shaft 9 between a position where the support 8 is substantially vertical with respect to a plane including the first and second foot bearing surfaces 23 and 24 as shown in FIG. 4 and a position where the support 8 is substantially horizontal with respect to the plane as shown in FIG. 3. The support 8 at the former position projects downwardly from the lower surface of the pedal body 2.

The support 8 may be kept at its substantially vertical position and horizontal position by the shaft 9 applied with a given friction, but the support 8 at the pedal of the invention is able to be kept in the aforesaid position in such a manner that; the bearings 81 at the support 8, as shown in FIGS. 3 and 4, are provided with flat faces 81b abutting against the front surface at the first foot bearing surface 23 to thereby control the substantially vertical position and keep the support 8 thereat; the support 8 is provided at the lengthwise edge with projections 82 serving as retainers; and the pedal body 2 is provided at its rear end face with recesses 29 serving as engaging portions, so that the projections 82 may be engaged with the recesses 29 respecitvely to keep the support 8 in its substantially horizontal position.

The reflectors 6 and 7 are formed of plastic plates and attached by fixing means, such as adhesives, to both the surfaces of the support 8 facing forward and backward of the bicycle when the support 8 projects downwardly at its substantially vertical position. The reflectors 6 and 7 each have a number of pyramidal protuberances for reflecting the light illuminated from the headlights of the automobile. Such the construction of reflector is well-known to be understandable without explanation in detail.

In addition, the support 8 is not particularly defined in position to be supported to the pedal body 2, but it is preferred that the support 8 is positioned at an intermediate portion between the first and second foot bearing surfaces 23 and 24, so that the pedal body 2, when carrying the support 8, allows its foot bearing surfaces 23, 24 and 25 to face always upward. The reflectors 6 and 7, other than provided at the front and rear surfaces of one support, may be attached to two supports 8 respectively.

The pedal constructed as foregoing is mounted to the crank arm K at the bicycle. In the daytime, the support 8 is kept in the horizontal position and the projections 82 are engaged with the recesses 29 respectively, whereby the support 8 is accommodated into the chamber 28 not to hinder pedalling. On the other hand, when the bicycle is driven in the night, the projections 82 are disengaged from the recesses 29 and the support 8 comes out of the chamber 28 to put the reflectors 6 and 7 in a substantially vertical position with respect to the pedal body 2. Thus, the reflectors 6 and 7 will reflect the light illuminated from the headlight of a vehicle, such as automobile, coming from before or after the bicycle, thereby allowing the driver for the vehicle to be careful of the running bicycle.

As clearly understood from the aforesaid description, the pedal of the invention has the pedal body carrying the support having the reflectors and being formed separately from the pedal body, so that the pedal body may be desirably designed to be shaped for reducing air-resistance, whereas the reflectors are mountable in the position where they function to obtain the full reflective effect.

Furthermore, the support is mounted to the pedal body swingably between the position where the support is substantially vertical to the pedal body and exposes the reflectors and the position where the support is kept substantially horizontal with respect to the pedal body, whereby when the reflectors are not necessary for use during the bicycle's running in the daytime, the support retracts not to hinder pedalling.

While a preferred embodiment of the invention has been described using specific terms, such description is for illustrative purpose only, and it is to be understood that changes and variations may be made without departing from the spirit or scope of the following claims.

What is claimed is:

1. A pedal for a bicycle, which is supported rotatably to a crank arm, said pedal comprising:

a pedal shaft;

a pedal body supported rotatably to said crank arm through said pedal shaft, said body being vertically displaced at the center downward with respect to said shaft, and said pedal body being provided at an upper surface thereof and at both sides of said pedal body longitudinally of the bicycle with at least first and second foot bearing surfaces and at a portion lower than said foot bearing surfaces with bearings for journaling a support;

a support having at one end reflectors and being supported swingably to said pedal body at a portion between said foot bearing surfaces by said bearings at a remaining end of said support, said support being adapted to swing between a position where said support is substantially vertical with respect to a plane including said first and second foot bearing surfaces, projecting downwardly from a lower surface of said pedal body, and a position where said support is substantially horizontal with respect to said plane, said support being restricted in one rotational direction by an abutment on said bearings which engages a continuous portion of said first foot bearing surfaces when said support is vertical;

under said first surface a receiving chamber for receiving said support when said support is horizontal to said plane; and a retaining means located on one of said pedal body and support, a remaining of said pedal body and support being provided with an engaging means for receiving said retaining means only when said support swings into a horizontal plane, said engaging and retaining means being disengageable releasing said support to assume a vertical orientation.

* * * * *